United States Patent [19]

Masui et al.

[11] Patent Number: 4,727,487

[45] Date of Patent: Feb. 23, 1988

[54] RESOURCE ALLOCATION METHOD IN A COMPUTER SYSTEM

[75] Inventors: Shoichi Masui, Kawasaki; Shunichi Tano, Machida; Motohisa Funabashi, Sagamihara; Koichi Haruna, Yokohama, all of Japan

[73] Assignee: Hitachi, Ltd., Tokyo, Japan

[21] Appl. No.: 760,917

[22] Filed: Jul. 31, 1985

[30] Foreign Application Priority Data

Jul. 31, 1984 [JP] Japan .................................. 59-162446

[51] Int. Cl.⁴ ............................................... G06F 1/00
[52] U.S. Cl. .................................................... 364/300
[58] Field of Search ................. 364/200 MS File, 300

[56] References Cited

U.S. PATENT DOCUMENTS 4,584,644  4/1986  Larner ................................. 364/200

Primary Examiner—Raulfe B. Zache
Attorney, Agent, or Firm—Antonelli, Terry & Wands

[57] ABSTRACT

A method of resource allocating to respective unit processes is disclosed which comprises, in order to allow the resource allocation based on experimental know-how of operation without assistance of a system operator, the steps of storing information of each unit processor including its priority, and names and functions of the resources required by that unit processor; storing information of each resource including an operation status and a process content of that resource; storing experimental know-how obtained in the operation of the system; and carrying out resource allocation to the unit processes in accordance with the stored experimental know-how when the operation status of the system corresponds to the stored experimental know-how and in the order of priorities of the unit processes as stored by taking reference to the stored information of each resource when the operation status of the system does not correspond to the stored experimental know-how, thereby improving the utilization efficiency of the resources.

9 Claims, 7 Drawing Figures

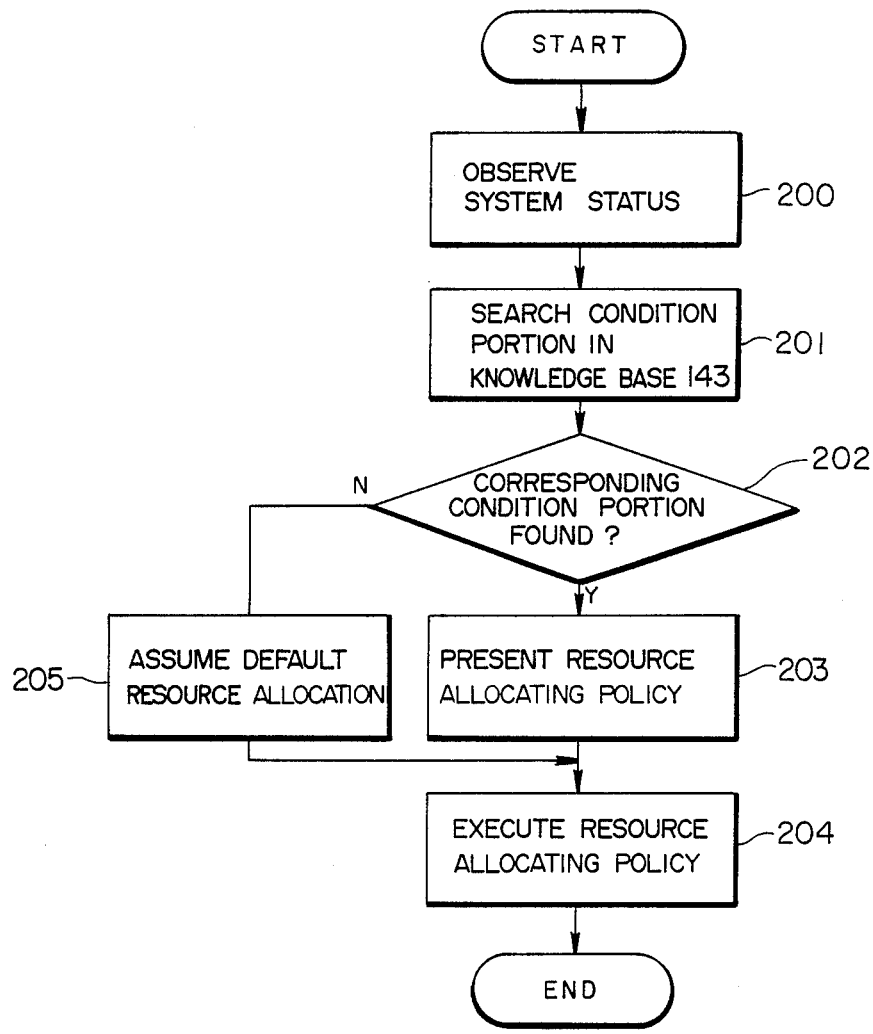

FIG. 3a

| 301 | 302 | 303 PROCESS REQUEST CODE | | | | | |
|---|---|---|---|---|---|---|---|
| | | 304 | 305 | 304' | 305' | 304" | 305" |
| UNIT PROCESS NUMBER | PRIO | RESOURCE NUMBER | REQUEST FUNCTION | | | | |
| 5 | 50 | 1 | 3 | 5 | 1 | 6 | 1 |

FIG. 3b

| 310 | 311 | 312 RESOURCE UTILIZATION STATUS | | | | | |
|---|---|---|---|---|---|---|---|
| | | 313 | 314 | 313' | 314' | 313" | 314" |
| RESOURCE NUMBER | UTI | RESOURCE FUNCTION | OCCUPIED UNIT PROCESS | | | | |
| 5 | 0 | 1 | 1 | 2 | 1 | | |

FIG. 5a

```
IF  CLASS-B #JOB-NUMBER ≧ 10        } 501
    CLASS-C #JOB-NUMBER ≈ 0

THEN CHANGE PARTITION C TO PARTITION B } 502
```

FIG. 5b

```
IF  UNIT #WAITING ≧ 10              } 511
    #PRIORITY <PRIO>

THEN CHANGE #PRIORITY <PRIO> *2     } 512
```

RESOURCE ALLOCATION METHOD IN A COMPUTER SYSTEM

BACKGROUND OF THE INVENTION

1. Field of the Invention

The present invention relates to a method for allocating resources by utilizing experimental knowledge of a system operator to enhance system performance, and more particularly to a method for allocating resources to user jobs (unit processes) in an electronic computer system.

2. Description of the Prior Art

In resource management, in a computer system, resources in the system are allocated so as to enhance system performance and system response.

In the prior art resource management, in order to effectively utilize the resources in a system, the system operator experimentally determines a resource allocating plan and then, after executing the resource allocating plan, measures the resultant utilization factors of the resources, queue status of the unit processes by jobs and transactions in the system, and resource allocating status. If the measured values deviate from the target values thereof, the system operator modifies the resource allocating plan so as to cause the measurements to approch the target values. However, recent rapid increase in the number of resources to be handled in the resource management (large capacities of main memory, disk or mass storage system (MSS) and multipurpose processing units) involves various problems such that the overhead of the resource management increases (large scaled operating system) and the required memory capacity also increases. In a case where a target value is represented by a given function which is variable dependent on various parameters, for example, a processing time (target value) is represented by a function of the number of queued jobs and the characteristic curve representing the function is variable dependent on various parameters, it is required to optimize those parameters. This is done by the system operator of the computer system by making adjustments in accordance with the operator's experience of operation. Since the unit processes in the system vary in quantity and quality every time, the operator must always monitor the status changes to adjust the parameters as required. Accordingly, automatization to reduce the workload of the operator is highly desired. However, since the adjustment work largely depends on the experience and knowledge of the operator, such automatization has been hard to attain. Further, since the parameters are adjusted in a trial and error fashion each time the system is expanded, it is difficult to automate the work done by the operator.

SUMMARY OF THE INVENTION

It is an object of the present invention to provide a resource allocating method which allows effective utilization of resources in the system in accordance with experience of operation without assistance of a system operator when parameters for determining the allocation of the resources are to be modified.

In order to achieve the above object, according to the invention, a method for allocating resources in a computer system in which a plurality of unit processes share a plurality of resources, is provided to, which method comprises the steps of storing information of each process unit including its priority and the names and functions of resources required by that process unit, storing information of each resource including the operation status and process content thereof, storing experimental know-how knowledge obtained in the operation of the system, determining the resource allocation to the unit process based on the stored experimental know-how when the operation status corresponds to the stored experimental know-how, and determining the resource allocation to the unit process in the order of priorities as stored by referring to the stored information of each resource.

BRIEF DESCRIPTION OF THE DRAWINGS

FIG. 2 shows an operational flow chart of a resource management function unit;

FIG. 3a shows a function code of a unit process;

FIG. 3b shows a resource function code and a processing code;

FIGS. 5a and 5b show examples of experimental knowledge.

DESCRIPTION OF THE PREFERRED EMBODIMENTS

Figure 1:
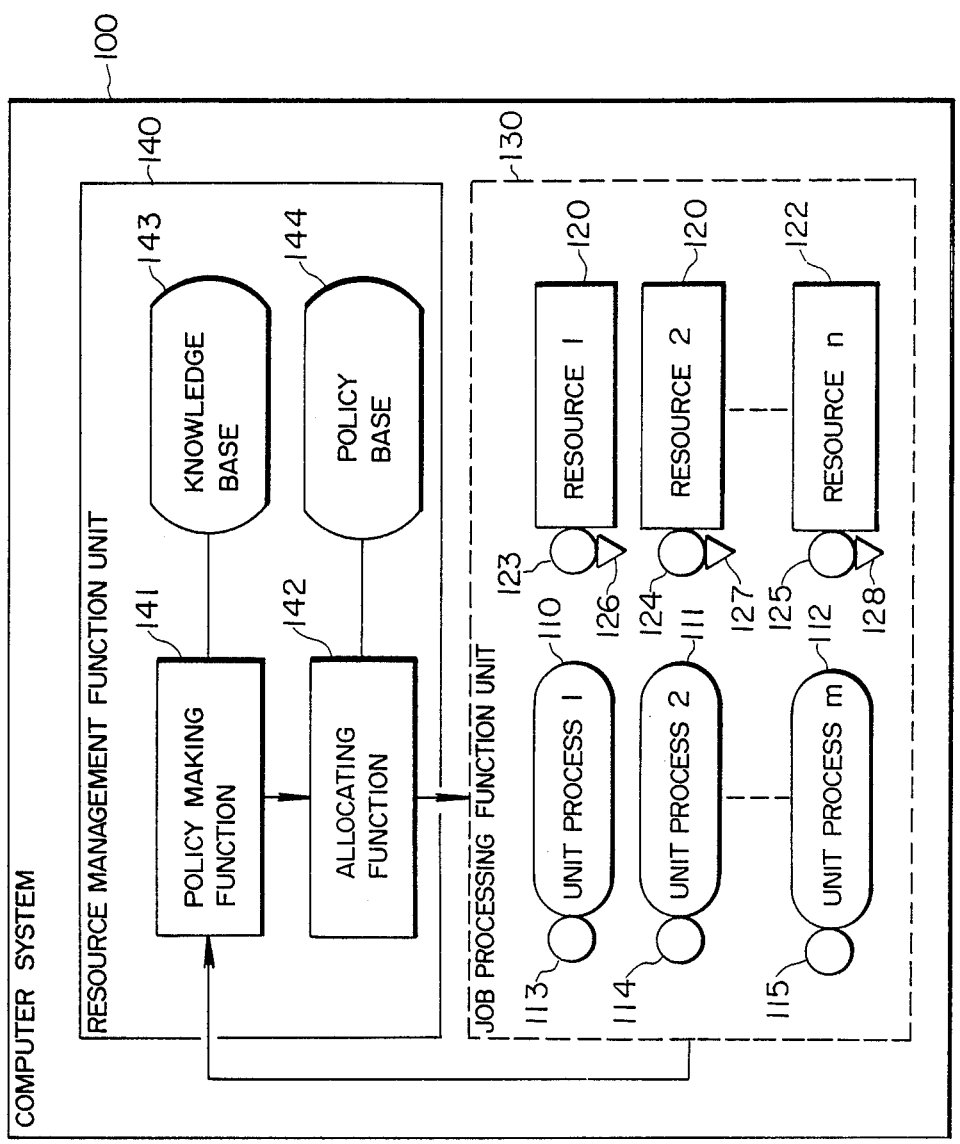
FIG. 1 shows a functional diagram of a computer system in accordance with one embodiment of the present invention.

FIG. 1 is a functional diagram of a computer system in accordance with one embodiment of the present invention.

In FIG. 1, a computer system 100 comprises a job processing function unit 130, including function codes 113–115 which indicate the contents of processing required by the unit processes to resources 120–122 in a system having a CPU, main memory, auxiliary memory, I/O channel, printer and CRT, function codes 123–125 which indicate the contents of processing of the resources, and function codes 126–128 which indicate the current status of the resources; and a resource management function unit 140, including a policy making function 141, an allocating function 142, a knowledge base 143 and a policy base 144.

The resource management function unit 140 determines which of the resources 120–122 are to be allocated to the unit processes 110–112, based on the knowledge base 143 and the policy base 144. The knowledge base 143 imparts an execution command in accordance with the status of the computer to the policy making function 141 based on the operational experience of the system operator. The knowledge base 143 stores experimental knowledge based on the system operator's operation experience, as will be described more detail with reference to FIG. 5, such as "Assume a resource allocating policy Y if the internal status of the computer or the unit process status is X", or more specifically, "Put a partition C free from its original service area for a predetermined period of time and transfer its service area to a job of a partition B if the number of queuing jobs of the partition B is larger than a predetermined number and the number of queuing jobs of the partition C is almost zero." The knowledge may be expressed in various ways. In the present embodiment, an expression "if X then Y" which has been widely used in knowledge engineering is used.

The policy making function 141 determines the resource allocating policy Y based on the knowledge (execution contents adapted to the status) stored in the knowledge base 143 in a manner as mentioned hereinafter and the policy base 144 stores procedures by which the allocating function 142 realizes the determined resource allocating policy Y upon receiving the policy Y.

FIG. 2 shows an operational flow chart of the resource management function unit 140. The policy making function 141 observes the internal status of the job processing function unit 130 and the status of the unit processes 110-112 (step 200) to check if the "if X" portion (condition portion) matching the content of observation exists in the knowledge base 143 (step 201), and if the matching "if X" portion is not found in a predetermined range which will be described later with reference to FIG. 5 (step 202), a predetermined resource allocating policy (default: implied) is presented to the allocating function 142 (step 205).

On the other hand, if the matching "if X" portion is found, the corresponding "then Y" portion (execution portion) is also presented to the allocating function 142 (step 203). The allocating function 142 executes the resource allocation to the unit process based on the presented contents while taking reference to the policy base 144 (step 204). The default resource allocating policy to be executed in the step 204 is basically to allocate an idle one or more among those resources which can meet the process requirements to the unit process which is in the resource waiting status. To this end, the function codes 113-115 and 123-125 and the process codes 126-128 are provided for each of the unit processes 110-112 and each of the resources 120-122.

FIG. 3a shows the function code of the unit process. Numeral 301 denotes a unit process number (1, 2, ... m), numeral 302 denotes a unit process priority (PRIO), numeral 303 denotes a process request code which the unit process requests to the resource, numerals 304, 304', ... denote a resource number (1, 2, ... n) and numerals 305, 305', ... denote a request function to the resource.

The resource number 304 and the request function 305 are paired. The processing of the unit process is executable when all resources (and the functions) described in the process request code 303 are allocated to the unit process. For example, in FIG. 3a, the unit process No. 5 having a priority of 50 requests the function No. 3 (high speed processing) to the resource No. 1 (CPU), the format inputting (1) to the input disk (resource 5), and the format outputting (1) to the output disk (resource 6). The coding method may be arbitrarily determined for each computer system 100. The function codes 113-115 are generated when the unit process is activated and the same numbers are maintained until the processing is terminated. The priority 302 of the function code and the process request code 303 are set by the job management task which is a portion of the operating system, by decoding a job control language (JCL) designated by the user and recorded in a suitable memory means (not shown).

FIG. 3b shows the function code of the resource and the process code. Numeral 310 denotes the resource number (1, 2, ... n) which is identical to 304—304" in FIG. 3a, numeral 311 denotes the resource utility (UTI) in which "0" indicates idling (available), "1" indicates busy (not available) and "2" indicates fault (not available), numeral 312 denotes the utilization status of the resource, numerals 313, 313' and 313" denote the resource functions corresponding to the request functions 305—305" of FIG. 3a, numerals 314, 314' and 314" denote the unit process numbers which are the same as the numbers shown in the column 301 in FIG. 3a and indicate the respective numbers of the unit processes which occupy the resources 313, 313', and 313", respectively. Especially, the mark "- " or no number indicates that the corresponding resource is not occupied by any unit process.

The resource number 310 is not necessarily assigned one to each of the resources 120-122 but it may be assigned to an aggregation of a plurality of resources which are effectively used simultaneously, such as disks and drives. Thus, the resources can be of hireachy configuration and the resource management is facilitated. The resource function 313 and the occupied unit process 314 are paired.

For example, in FIG. 3b, the resource No. 5 has UTI "0" (idle) and neither the resource function 1 (read) or the function 2 (write) is used by the unit process. In FIG. 1, the function codes 123-125 and the process codes 126-128 are different from each other because of different objects thereof, although they may be consolidated as shown in FIG. 3b.

Figure 4:
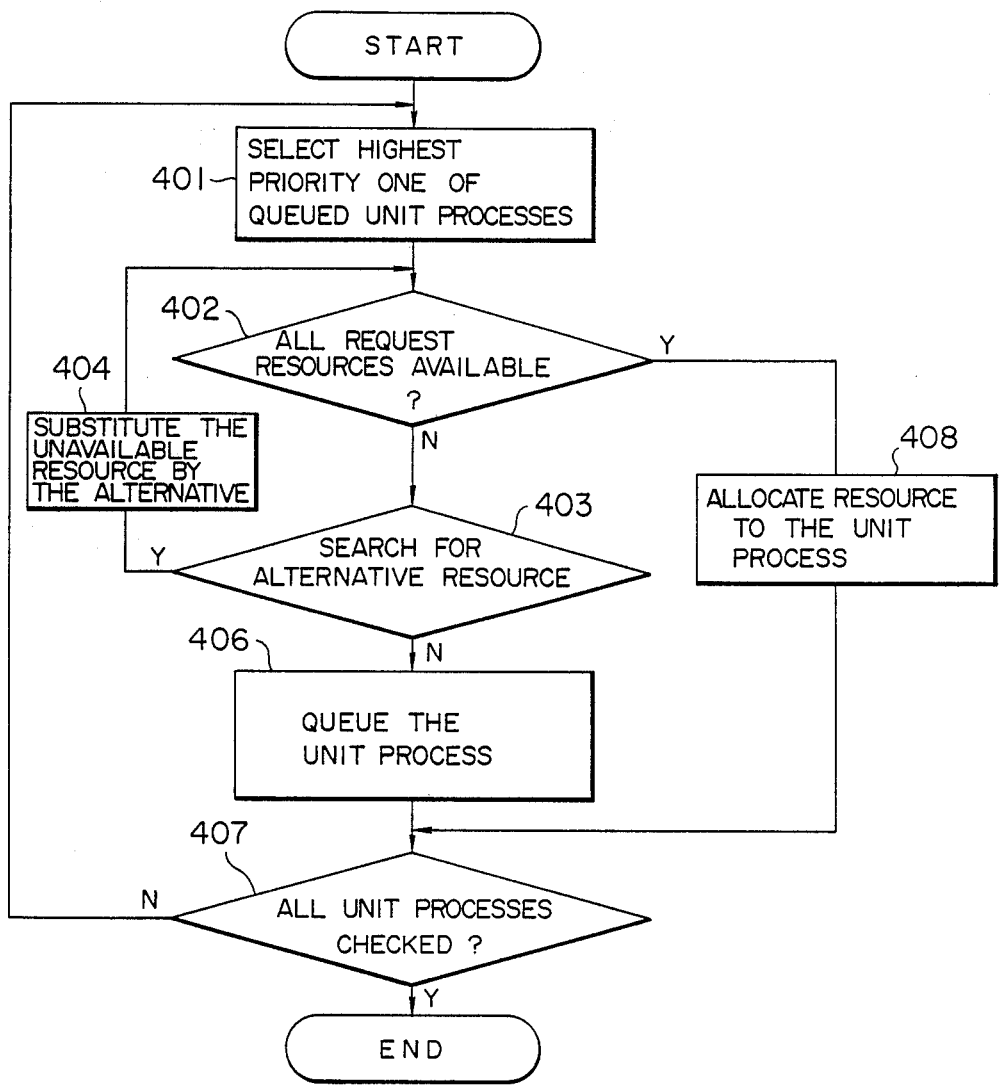
FIG. 4 shows an operational flow chart of an allocating function.

FIG. 4 shows a flow chart of the resource allocating procedure executed by the allocating function 142 in the step 204 of FIG. 2. The allocating function 142 selects the highest priority one of the waiting unit processes in response to the instruction from the policy making function 141 (step 401), and sequentially checks the availability of the resources denoted by the resource numbers 304—304" and the request functions thereof 305—305" described in the process request content 303 by checking whether the UTI 311 of each resource is idle "0" (available) or not (step 202). If any one of the resources is busy "1" or in failure "2" (not available), a step 403 is carried out to search for an alternative resource which is idle and meets the same request function 305. If such an alternative resource is found, the corresponding resource number described in the process request content 303 is replaced by the number of the alternative resource (step 404) and then the procedure returns to the step 102 so that all the resources are checked with respect to the availability thereof. If all the resources or alternative resources in the step 404 are confirmed as available (branch "yes" of the step 402), a step 108 is carried out to allocate the available resources to the unit process having the highest priority selected in the step 401 by setting the number of that unit process into the area 314 indicating the occupied unit process associated with the request resource function 313 for each of the available resources. If the step 403 fails to find an alternative resource for any unavailable resource, this means that the selected unit process cannot be executed due to no resource meeting at least one request function described in the process request content 303 and hence that unit process is queued (step 406). Then the resource allocating process is carried out to the queued unit processes in the sequence of the priority 302 (step 407). FIG. 5a and 5b show examples of experience bases stored in the knowledge base 143 in the form of "if X then Y". Numerals 501 and 511 denote the "if X" portions (condition portions), and numerals 502 and 511 denote "then Y" portions (execution portions).

As the operation system has been operated for a long period, much experimental operational knowledge in accordance with the characteristic of the system is accumulated. Such knowledge is usually held in a brain of the system operation and is too complex and ambiguous to be formulated as a model for mathematical optimization or linear programming. In practice, there exist various levels of experimental knowledge such that the policy in allocation of the resources must be changed to another policy when a certain status occurs, or the system configuration (e.g. memory partition) must be changed when another status occurs. Therefore, the operator must hitherto determine the system operation parameters based on such knowledge thereby to change the utilization status of the system resources. In the present invention, the contents of the above knowledge are expressed in the formats shown in FIGS. 5a and 5b and inputted to the computer.

The content of FIG. 5a states to change the partition C to the partition B (execution portion 502) if the number of jobs in the class B is larger than 10 and the number of jobs in the class C is near zero (condition portion 501). The content of FIG. 5b states to double the priority 302 of the unit process (execution portion 512) if the waiting time of that unit process is larger than 10.

In this manner, the experimental knowledge of the operator is expressed in the form of questions and answers and stored in the knowledge base 143. Specifically, the condition portions 501 and 511 and the execution portions 502 and 512 of FIGS. 5a and 5b are encoded and stored in the form of a table.

The policy making function 141 sequentially reads out the experimental knowledge shown in FIGS. 5a and 5b from the knowledge base 143 to carry out the steps 201 and 202 of FIG. 2 and checks to see if the condition portion 501 thereof matches the content of the job process function 130. In the decision, the symbol "≈" (representing "AROUND") used in the condition portion 501 indicates that the matching is not critical but allowed with a tolerance less than 10% of the required condition (especially, −1 to +1 for "0"). This is based on the fact that the experimental knowledge of the human beings includes much ambiguity (for example, expressions of more than approximately 10, or less than several tens). The range of 10% may be changed to any other range.

If they match, the execution portion 502 corresponding to the matching condition portion 501 is reported to the allocating function 142, which executes it.

In this manner, i) Since the experimental knowledge of the knowledge base 143 is appropriately adopted in accordance with the system status, the allocating policy, the procedure and the system configuration can be readily modified to achieve the effective system operation. ii) Since the default resource allocation is automatically carried out, the operator's work for the operation and the monitoring is significantly reduced. iii) Since the parameters and the experimental knowledge can be modified or added for the simple formats shown in FIGS. 3 and 5, the operator's knowledge is readily reflected on the resource allocation. iv) While the resource management in the computer system is described in the present embodiment, the present invention may be widely applied to a plant system, a factory automation (FA), a laboratory automation (LA) and an office automation (OA) which require the resource allocation.

In accordance with the present invention, the resources in the system are automatically allocated to the waiting unit processes in accordance with the default resource allocating policy, and the experimental knowledge which is the experimental know-how obtained in the operation of the system is adopted in accordance with the system status so that the resources are effectively utilized. Accordingly, the system performance is improved without wide assistance of the operator.

We claim:

1. A method for allocating resources in an electronic computer system having a plurality of unit processes sharing a plurality of resources, comprising the steps of:
   storing in said electronic computer system information of each unit process including its priority, and names and functions of the resources required by that unit process;
   storing in said electronic computer system information of each resource including an operation status and a process content of that resource;
   storing in said electronic computer system experimental knowledge concerning operation of the electronic computer system; and
   carrying out in said electronic computer system resource allocation to the unit processes in accordance with the stored experimental knowledge when the operation status of the system corresponds to the stored experimental knowledge and in an order of priorities of the unit processes as stored by taking reference to stored information of each resource when an operation status of the system does not correspond to the stored experimental knowledge.

2. A system for allocating resources in an electronic computer system having a plurality of unit processes sharing a plurality of resources, comprising:
   knowledge base means for storing policy making knowledge data;
   policy base means for storing procedures for allocating the resources to said unit processes;
   first means for indicating a status of said unit processes;
   second means responsive to said knowledge base means and said first means for checking whether there is policy making knowledge data in said knowledge base means matching the indicated status of said unit processes; and
   a third means responsive to said second means and said policy base means for allocating the resources to said unit processes in response to said second means and said policy base means.

3. A system according to claim 2, wherein each of said policy making knowledge data stored in said knowledge base means is expressed by an "If-(X)-Then-(Y)" rule.

4. A system according to claim 3, further comprising fourth means responsive to said second means for presenting a predetermined resource allocating policy to said third means, when said indicated status does not match any If-(X) portion of the policy making knowledge data in a predetermined range of said knowledge base means.

5. A system according to claim 3, further comprising job processing function means connected to said first means for storing a status of said unit processes and a status of the resources, and wherein said first means comprises means for indicating a status of the resources as well as a status of the unit processes.

6. A system according to claim 3, further comprising job processing function means connected to said first means for storing a status of said unit processes and a status of the resources in the form of functin codes, and wherein said third means comprises means for allocating the resources based on the function codes of said resources and said unit processes.

7. A system according to claim 3, wherein said third means comprises means for selecting the unit processes in allocating the resources thereto in an order of predetermined priorities.

8. A system according to claim 3, further comprising job processing function means connected to said first means for storing a status of said unit processes and a status of the resources, including information as to whether each of the resources is available or not, and wherein said third means comprises means for allocating the resources based on the information as to whether each of the resources is available or not.

9. A system according to claim 3, wherein said third means comprises means for allocating the resources to the unit processes according to a request of each processing unit, and said system further comprises fourth means responsive to said third means for queuing those unit processes to which said third means is not able to allocate any resource designated by a request of that unit process.

* * * * *